United States Patent
Ogita et al.

(10) Patent No.: US 10,524,128 B2
(45) Date of Patent: Dec. 31, 2019

(54) TERMINAL DEVICE, CONNECTION METHOD, CONNECTION PROGRAM, AND AUTHENTICATION ASSIST SYSTEM

(71) Applicant: TownWifi Inc., Tokyo (JP)

(72) Inventors: Takehiro Ogita, Tokyo (JP); Atsushi Tobe, Tokyo (JP)

(73) Assignee: TownWiFi Inc., Tokyo (JP)

( * ) Notice: Subject to any disclaimer, the term of this patent is extended or adjusted under 35 U.S.C. 154(b) by 0 days.

(21) Appl. No.: 16/466,429

(22) PCT Filed: May 16, 2017

(86) PCT No.: PCT/JP2017/018357
§ 371 (c)(1),
(2) Date: Jun. 4, 2019

(87) PCT Pub. No.: WO2018/109962
PCT Pub. Date: Jun. 21, 2018

(65) Prior Publication Data
US 2019/0313255 A1 Oct. 10, 2019

(30) Foreign Application Priority Data
Dec. 15, 2016 (JP) .................. 2016-243279

(51) Int. Cl.
*H04W 12/06* (2009.01)
*H04W 76/18* (2018.01)
(Continued)

(52) U.S. Cl.
CPC ....... *H04W 12/0605* (2019.01); *H04W 12/06* (2013.01); *H04W 12/0609* (2019.01);
(Continued)

(58) Field of Classification Search
CPC ..... H04W 12/06; H04W 12/04; H04W 12/08; H04W 4/80; H04W 12/02; H04W 12/003;
(Continued)

(56) References Cited

U.S. PATENT DOCUMENTS

2007/0186105 A1* 8/2007 Bailey ................. H04L 63/0492
713/168
2012/0317261 A1* 12/2012 Ahmavaara ......... H04L 63/0815
709/223
2017/0148018 A1* 5/2017 Levin ................... G06Q 20/202

FOREIGN PATENT DOCUMENTS

JP 2004-080138 A 3/2004
JP 2004304710 A 10/2004
(Continued)

OTHER PUBLICATIONS

Translation of International Search Report and Written Opinion dated Jun. 13, 2017 in corresponding International application No. PCT/JP2017/018357; 6 pages.

*Primary Examiner* — Quan M Hua
(74) *Attorney, Agent, or Firm* — Maier & Maier, PLLC

(57) ABSTRACT

To provide a terminal device, a connection method, a connection program, and an authentication assist system with which it is possible to reduce a user's time and effort and authenticate a connection to various public wireless LANs. A terminal device for establishing a wireless connection between an access point and itself and performing communication. The terminal device is provided with a terminal communication unit connected to the access point and an authentication assist server, a terminal storage unit for storing an authentication protocol that corresponds to multiple types of access points, and a terminal control unit for determining the type of authentication information transmitted from the access point, proceeding with an authentication step based on authentication information by an
(Continued)

authentication protocol that corresponds to the determination result, and transmitting the authentication result of the authentication step to the authentication assist server via the terminal communication unit.

11 Claims, 10 Drawing Sheets

(51) Int. Cl.
    *H04W 84/12*     (2009.01)
    *H04W 76/10*     (2018.01)

(52) U.S. Cl.
    CPC ........... *H04W 76/10* (2018.02); *H04W 76/18* (2018.02); *H04W 84/12* (2013.01)

(58) Field of Classification Search
    CPC ........... H04W 84/18; H04W 12/00512; H04W 12/00514; H04W 12/04031; H04W 12/10; H04W 4/50; H04W 4/60; H04W 4/70; H04W 12/0023; H04W 12/00403; H04W 40/248; H04W 48/08; H04W 12/04033; H04W 12/0609
    See application file for complete search history.

(56) References Cited

FOREIGN PATENT DOCUMENTS

| | | |
|---|---|---|
| JP | 2011211496 A | 10/2011 |
| WO | 2015076345 A1 | 5/2015 |

\* cited by examiner

FIG.3

| TYPE No. | AUTHENTICATION TYPE (1) | AUTHENTICATION TYPE (2) | AUTHENTICATION TYPE (3) |
|---|---|---|---|
| AUTHENTICATION METHOD NAME | ONLY ONE-TAP | E-MAIL ADDRESS REGISTRATION TYPE | MEMBERSHIP REGISTRATION TYPE |
| AUTHENTICATION PROTOCOL | CONFIRM ONE-TAP | INPUT E-MAIL ADDRESS | INPUT MEMBERSHIP INFORMATION (E-MAIL ADDRESS, GENDER, BIRTH DATE, AND PASSWORD) |
| | CONNECTION AUTHENTICATION COMPLETION | TRANSMIT E-MAIL ADDRESS | TRANSMIT MEMBERSHIP INFORMATION |
| | | CONNECTION AUTHENTICATION COMPLETION | RECEIVE PW |
| | | | INPUT PW |
| | | | TRANSMIT PW |
| | | | CONNECTION AUTHENTICATION COMPLETION |

FIG.4
(a)
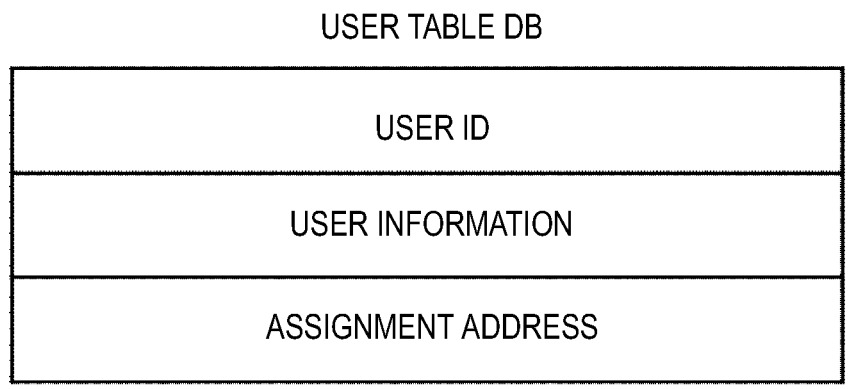
(b)
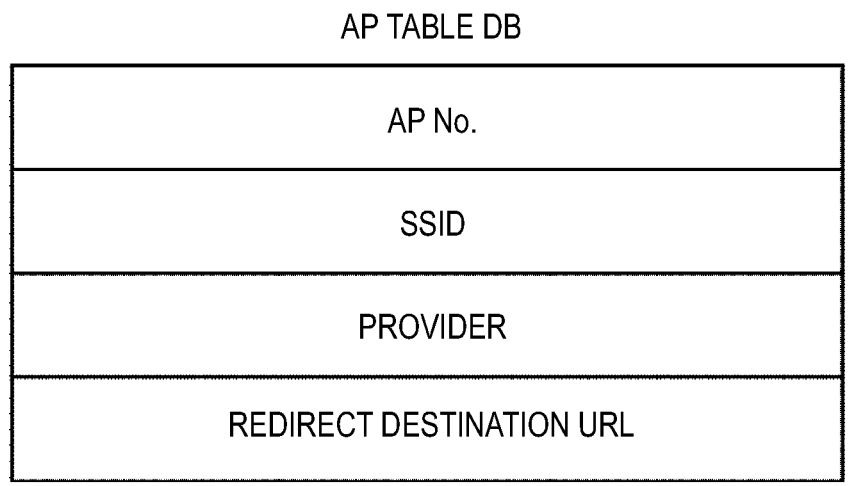

TERMINAL DEVICE, CONNECTION METHOD, CONNECTION PROGRAM, AND AUTHENTICATION ASSIST SYSTEM

FIELD

The present invention relates to a terminal device, a connection method, a connection program, and an authentication assist system that make it possible to easily connect a terminal device to various public wireless LANs.

BACKGROUND

Public wireless LANs are open in public areas such as convenience stores, cafes, hotels, and airports. However, public wireless LANs often perform terminal authentication in connection in order for a public wireless LAN provider to manage a connection state and the like.

However, in the authentication operation of the terminal, there is a problem that it takes user's time and effort at the time of initial setting for connecting a user to a public wireless LAN and at the time of reconnection.

Therefore, for example, in Patent Document 1, there is proposed a user authentication method in which the convenience of the user is improved by automatically processing authentication procedures required for each public wireless LAN in the terminal of the user.

CITATION LIST

Patent Document

Patent Document 1: JP-A-2004-80138

SUMMARY

However, there are many types of authentication procedures required for each public wireless LAN, and it may be difficult to connect to a new public wireless access point or to respond to a change in authentication procedures.

Therefore, an object of the invention is to provide a terminal device, a connection method, a connection program, and an authentication assist system with which it is possible to reduce the user's time and effort and authenticate connection to various public wireless LANs.

There is provided a terminal device for establishing a wireless connection between an access point and itself and performing communication, including: a terminal communication unit connected to the access point and an authentication assist server; a terminal storage unit for storing an authentication protocol that corresponds to a plurality of types of access points; and a terminal control unit for determining a type of authentication information transmitted from the access point, proceeding with an authentication step based on the authentication information by the authentication protocol that corresponds to a determination result, and transmitting an authentication result of the authentication step to the authentication assist server through the terminal communication unit, in which the authentication protocol includes a complete authentication protocol in which a procedure of the authentication step up to connection authentication completion is described, and an incomplete authentication protocol in which a procedure of the authentication step up to a step in the middle of connection authentication is described.

Also, there is provided a connection method of a terminal device for establishing a wireless connection between an access point and itself and performing communication, including: a connection step of performing connection to the access point by a terminal communication unit; a reception step of receiving authentication information from the access point by the terminal communication unit; a determination step of determining a type of the authentication information by a terminal control unit; and an authentication step of proceeding with an authentication step based on the authentication information from a determination result of the determination step and an authentication protocol stored in a terminal storage unit, by the terminal control unit, in which the authentication protocol includes a complete authentication protocol in which a procedure of the authentication step up to connection authentication completion is described, and an incomplete authentication protocol in which a procedure of the authentication step up to a step in the middle of connection authentication is described.

Also, there is provided a connection program of a terminal device for establishing a wireless connection between an access point and itself and performing communication, that causes an electronic computer to execute a connection step of performing connection to the access point by a terminal communication unit; a reception step of receiving authentication information from the access point by the terminal communication unit; a determination step of determining a type of the authentication information by a terminal control unit; and an authentication step of proceeding with an authentication step based on the authentication information from a determination result of the determination step and an authentication protocol stored in a terminal storage unit, by the terminal control unit, in which the authentication protocol includes a complete authentication protocol in which a procedure of the authentication step up to connection authentication completion is described, and an incomplete authentication protocol in which a procedure of the authentication step up to a step in the middle of connection authentication is described.

Also, there is provided an authentication assist system for authenticating a wireless connection between a terminal device and an access point, including: an authentication assist server storing an access point table corresponding to the access point, and a user table corresponding to the terminal device; the terminal device requesting connection with the access point; the access point transmitting authentication information in response to a connection request from the terminal device; and a network connecting the authentication assist server, the access point, and the terminal device, in which the terminal device includes a terminal communication unit connected to the access point and the authentication assist server, a terminal storage unit for storing an authentication protocol that corresponds to a plurality of types of access points, and a terminal control unit for determining a type of authentication information transmitted from the access point, proceeding with an authentication step based on the authentication information by the authentication protocol that corresponds to a determination result, and transmitting an authentication result of the authentication step to the authentication assist server through the terminal communication unit, and the authentication protocol includes a complete authentication protocol in which a procedure of the authentication step up to connection authentication completion is described, and an incomplete authentication protocol in which a procedure of the authentication step up to a step in the middle of connection authentication is described.

According to the aforementioned terminal device, connection method, connection program, and authentication assist system, it is possible to reduce the user's time and effort and authenticate connection to various public wireless LANs.

BRIEF DESCRIPTION OF THE DRAWINGS

FIG. 3 is a table illustrating an authentication type list and an authentication protocol according to the first embodiment.

FIG. 4 is a table illustrating a user table DB and an AP table DB according to the first embodiment.

DETAILED DESCRIPTION

Hereinafter, the present embodiments will be described. Incidentally, the embodiments to be described later do not unduly limit the contents of the invention described in the claims. Also, not all of the configurations described in the embodiments are essential requirements of the invention.

First Embodiment

<Configuration>

First, in the first embodiment with reference to FIG. 1, the configuration and outline of an authentication assist system 1 including an authentication assist server 131 for assisting connection authentication of a terminal device to a public wireless LAN access point (hereinafter, referred to as a public wireless LAN-AP) will be described. Incidentally, FIG. 1 is a schematic block diagram of the authentication assist system 1 of this embodiment.

Figure 1:
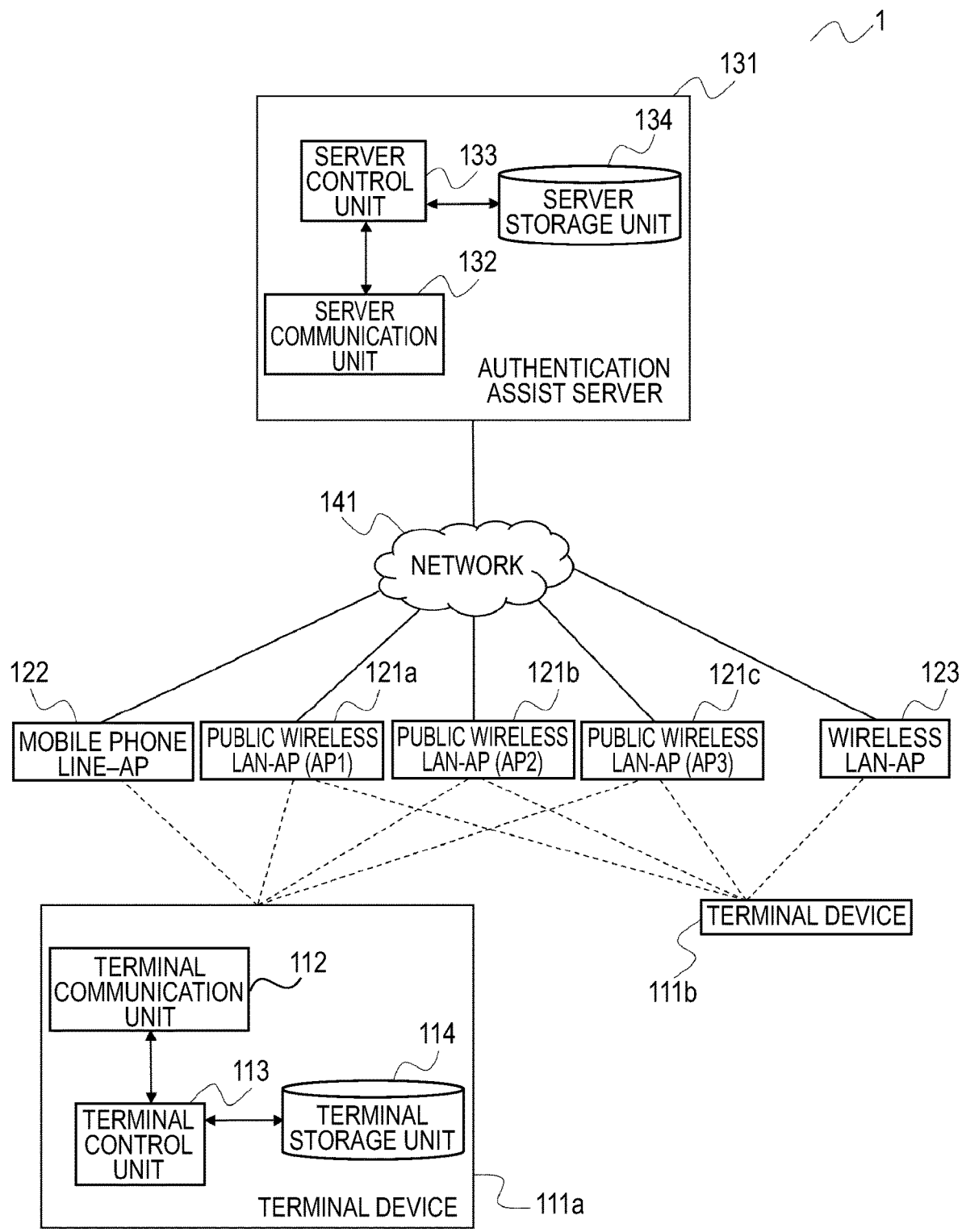
FIG. 1 is a schematic block diagram illustrating a configuration of an authentication assist system according to a first embodiment.

As illustrated in FIG. 1, the authentication assist system 1 of the embodiment includes public wireless LAN-APs 121a to 121c (hereinafter, collectively referred to as public wireless LAN-AP 121) and mobile phone line access point 122 (hereinafter, referred to as mobile phone line-AP 122), a wireless LAN access point 123 (hereinafter, referred to as a wireless LAN-AP 123) installed in homes and the like, and an authentication assist server 131 that are configured to be connectable to a network 141 such as the Internet. The terminal devices 111a and 111b (hereinafter, collectively referred to as the terminal device 111) are capable of being connected to the network 141 through the public wireless LAN-AP 121, the mobile phone line-AP 122, and the wireless LAN-AP 123.

The terminal device 111 is a terminal device capable of communicating with the Internet or the like. The terminal device 111 is connected to the network 141 such as the Internet through the public wireless LAN-AP 121, the mobile phone line-AP 122, or the wireless LAN-AP 123. The terminal device 111 includes a terminal communication unit 112, a terminal control unit 113, and a terminal storage unit 114.

The terminal device 111 is an information processing device such as a smartphone, a mobile phone, a PHS, a computer, a game device, a PDA, a watch, a smartwatch, a head mounted display, an image generation device, and is a device connectable to the authentication assist server 131 through the network 141.

The terminal communication unit 112 is a communication interface that communicates with the authentication assist server 131, the public wireless LAN-AP 121, or the like through the network 141. Also, the terminal communication unit, receives an application program for assisting connection of the terminal device 111 to the public wireless LAN-AP, and transmits information to the authentication assist server 131. Also, authentication HyperText Markup Language (HTML) is received as authentication information transmitted from the public wireless LAN-AP.

The terminal control unit 113 attempts to connect the terminal device to the public wireless LAN-AP according to an Access Point (AP) table, performs analysis of authentication HTML, or identifies a type. Also, a log of the process of connection authentication is generated, stored in the terminal storage unit 114, and transmitted to the authentication assist server 131. Incidentally, the details of the AP table will be described later.

The terminal storage unit 114 stores an application program (hereinafter, referred to as an application) for using the terminal device 111 in the authentication assist system 1, user information, password information for authentication, an AP list that are a list of access points to which the terminal device 111 is connectable, or an AP table. Also, the log of the process of connection authentication that has been generated by the terminal control unit 113 is stored.

The public wireless LAN-AP 121 is a wireless LAN access point installed in public areas such as convenience stores, cafes, hotels, and airports, and is accessible by various users as a public line. The wireless LAN-AP in the embodiment does not indicate only installed access points, but also includes other infrastructure facilities such as an authentication server required for its use. The public wireless LAN-AP is connected to the Internet and the like, and it is possible to connect the terminal device 111 to the Internet and the like by performing connection authentication of the terminal device 111 to the public wireless LAN-AP. The public wireless LAN-AP 121 is classifiable into several types according to a connection authentication type of the user. In the embodiment, the public wireless LAN-AP 121a, the public wireless LAN-AP 121b, and the public wireless LAN-AP 121c in FIG. 1 will be described as three types of AP1-121a, AP2-121b, and AP3-121c.

The mobile phone line-AP 122 is an access point for connecting a mobile phone line for voice communication such as a mobile phone or a smartphone or a mobile phone line mobile broadband, and includes a radio wave base station and the like. The mobile phone line-AP in the embodiment does not indicate only installed access points, but also includes other infrastructure facilities such as an authentication server required for its use. The mobile phone line-AP is connected to the Internet and the like through each mobile phone provider, and it is possible to connect the terminal device 111 to the Internet and the like by performing the connection authentication of the terminal device 111 to the mobile phone line-AP. Incidentally, the mobile phone line is not limited to a 3G network, a 4G network, and a LTE network, and may be a network provided by a mobile phone provider or the like.

For example, the wireless LAN-AP 123 indicates a wireless LAN access point used by a specific person at a home or an office. The wireless LAN-AP in the embodiment does not indicate only installed access points, but also includes other infrastructure facilities such as an authentication server of an Internet provider and the like required for its use. In a case where the terminal device 111 is used in homes or the like, it is possible to connect the terminal device 111 to the Internet or the like through the wireless LAN-AP.

The authentication assist server 131 is a server that provides information for assisting connection of the terminal device 111 to the public wireless LAN-AP 121. The authentication assist server 131 includes a server communication unit 132, a server control unit 133, and a server storage unit 134.

The server communication unit 132 is a communication interface that communicates with the terminal device 111 through the network 141. The server communication unit 132 receives a request signal from the terminal device 111 or transmits information to the terminal device 111.

The server control unit 133 generates a user table DB from user information that has been transmitted from the terminal device 111, and stores the user table DB in the server storage unit 134 or transmits, to the terminal device 111, the AP list or the AP table stored in the server storage unit 134 to be described later, in response to a request from the terminal device 111.

The server storage unit 134 stores the user table DB including user information of a user who uses the terminal device and being generated by the server control unit 133, an AP list DB that is a list of access points to which the terminal device 111 is connectable, or an AP table DB including individual information of access points. Furthermore, an authentication log recording the process of the connection authentication, which has been transmitted from the terminal device 111, is stored.

<Flow of Processing>

Figure 2:
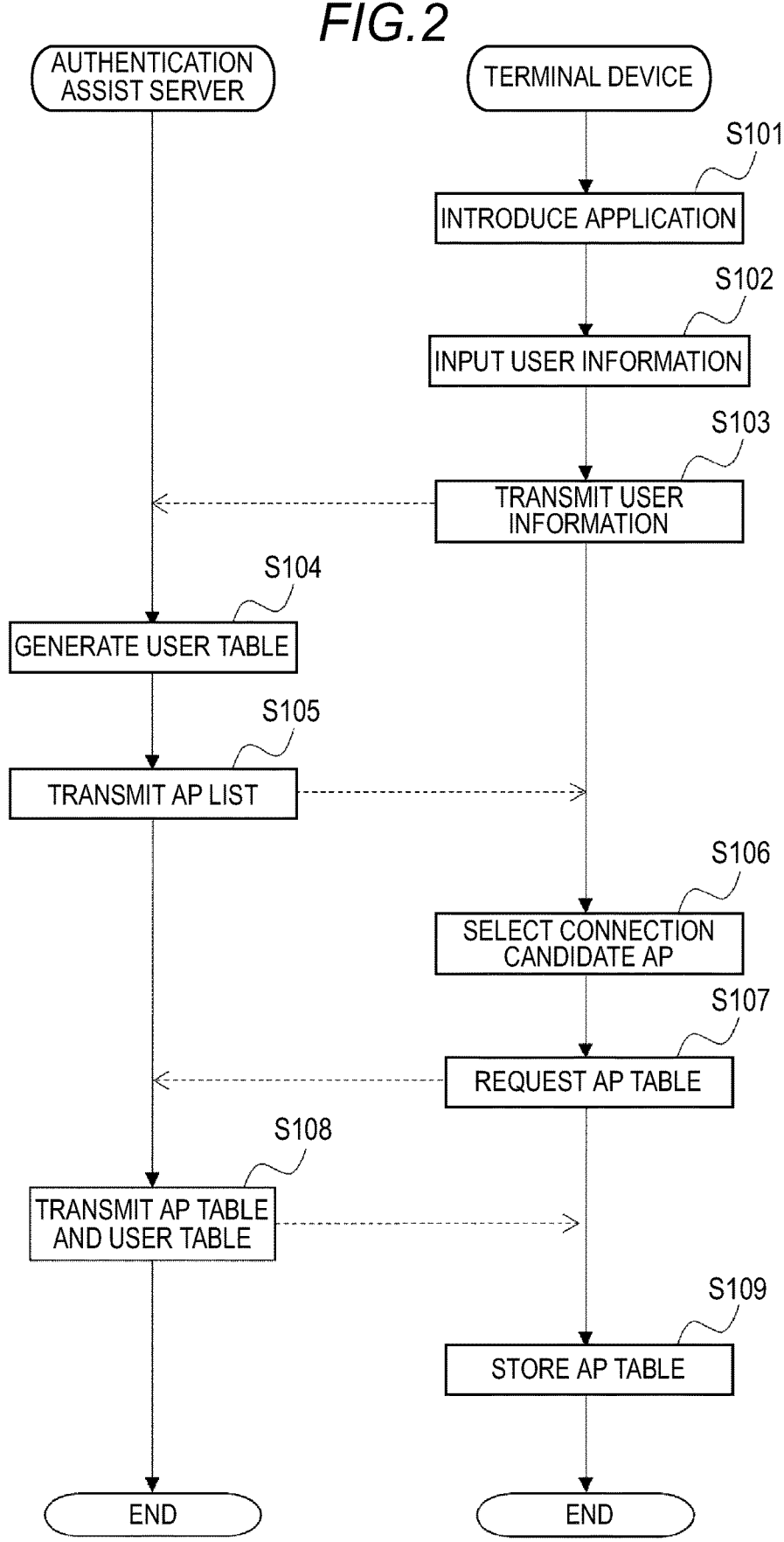
FIG. 2 is a flowchart for describing operations of a terminal device and an authentication assist server according to the first embodiment.
Figure 5:
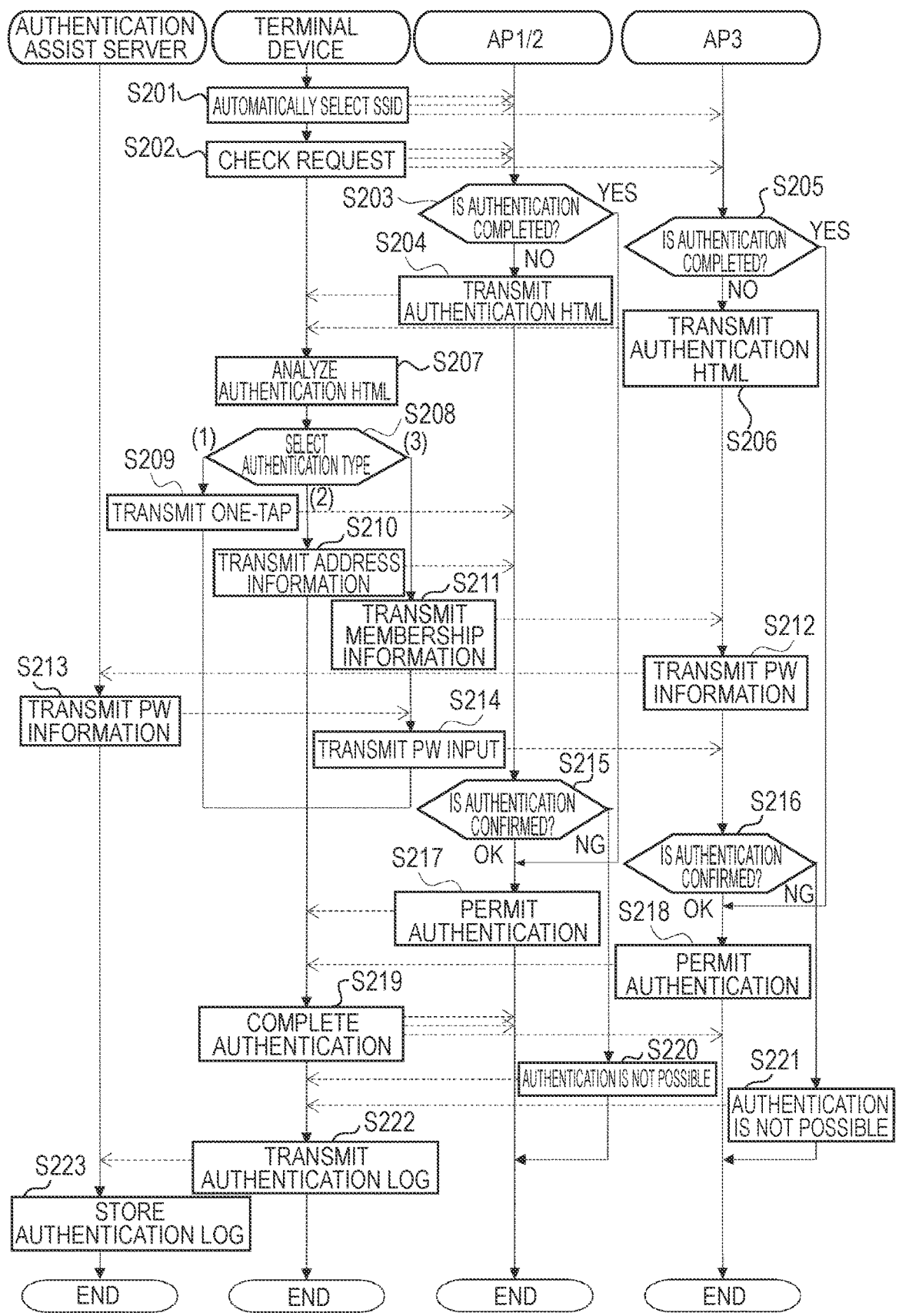
FIG. 5 is a flowchart for describing operations of the terminal device, a public wireless LAN-AP, and the authentication assist server according to the first embodiment.

The operations of the authentication assist server 131, the terminal device 111, and the public wireless LAN-AP 121 in the authentication assist system 1 according to the first embodiment of the invention will be described with reference to flowcharts illustrated in FIGS. 2 and 5, the table of the authentication type list and authentication protocol illustrated in FIG. 3, the user table database (user table DB) illustrated in FIG. 4(a) and the access point table database (AP table DB) illustrated in FIG. 4(b). FIG. 2 is a flowchart illustrating operations when the terminal device 111 is connected to the authentication assist server 131 for the first time, and illustrates a related state of each operation between the authentication assist server 131 and the terminal device 111. FIG. 5 is a flowchart illustrating operations when the terminal device 111 is connected to the public wireless LAN-AP 121, and illustrates a related state of each operation among the authentication assist server 131, the terminal device 111, and the public wireless LAN-AP 121.

(At the Time of Application Introduction)

Operations when the application program is introduced to terminal device 111 and the terminal device 111 is connected to the authentication assist server 131 for the first time will be described with reference to FIG. 2.

In step S101, a user of the terminal device 111 installs an application for using the terminal device 111 in the authentication assist system 1, on the terminal device 111. The user is capable of obtain an application by downloading the application from an application distribution server on the Internet to the terminal device 111. The terminal device 111 is connectable to the network 141 through the mobile phone line-AP 122 or the wireless LAN-AP 123. Therefore, the terminal device 111 is capable of downloading the application from the Internet. Also, the terminal device 111 is capable of communicating with the authentication assist server 131. The application is stored in the terminal storage unit 114 by the terminal control unit 113 from the network 141 through the terminal communication unit 112. The application includes authentication protocol information.

Here, FIG. 3 is a table describing an authentication type and an authentication protocol corresponding to the authentication type. The authentication protocol illustrates steps of processing from top to bottom. When the authentication type (3) is taken as an example, membership information is input in a predetermined form in a first stage, and transmitted to an access point by registration in a second stage. A password (PW) is received in a third stage, the PW is input in a fourth stage, and the PW is transmitted to the access point in a fifth stage. Then, steps in which connection authentication completion has been completed will be described. The authentication protocol may be described in any format as long as the format is processible by the terminal control unit 113, and there is no limitation on the description method.

In step S102, the user inputs user information requested by the application into the terminal device 111. The user information is information such as the user's birth date and gender. The user information may include information such as the user's name, e-mail address and passport information. The input user information is stored in the terminal storage unit 114.

In step S103, the terminal control unit 113 transmits user information stored in the terminal storage unit 114 in step S102, to the authentication assist server 131 through the terminal communication unit 112.

In step S104, based on the user information transmitted from the terminal device 111, the server control unit 133 generates a user table, and stores the user table in the server storage unit 134. As illustrated in FIG. 4(a), the user table includes a user ID, user information transmitted from the terminal device 111, and assignment address information assigned by the server control unit to each user ID. The assignment address is an e-mail address corresponding to each user generated by the server control unit 133.

In step S105, the authentication assist server 131 transmits, to the terminal device 111, an access point list (hereinafter, referred to as an AP list) that is a list of connectable public wireless LAN-APs stored in the server storage unit 134.

In step S106, the user selects a desired access point to be connected, from the AP list that has been transmitted from the authentication assist server 131.

In step S107, the terminal control unit 113 requests an access point table (hereinafter, referred to as an AP table) corresponding to the access point that has been selected in step S106, to the authentication assist server 131.

In step S108, the terminal control unit 133 transmits, to the terminal device 111, AP table DB information in FIG. 4(b), in response to an AP table request that has been transmitted from the terminal device 111. As illustrated in FIG. 4(b), the AP table DB is information including an access point's number (AP No.), an access point's Service Set Identifier (SSID), a name of a provider providing the access point, and a redirect destination URL at the time of connection authentication to the access point. Also, at the same time, the user table DB information in FIG. 4(a) is transmitted to the terminal device 111. The user table DB includes an assignment address generated by the server control unit, and the assignment address is stored in the terminal storage unit 114.

In step S109, the terminal control unit 113 stores, in the terminal storage unit 114, the AP table that has been transmitted from the authentication assist server 131 through the terminal communication unit 112.

(At the Time of Access Point Connection)

Operations when the terminal device 111 is connected to the public wireless LAN-AP 121 will be described with reference to FIG. 5. The flowchart in FIG. 5 illustrates a related state of each operation among the authentication assist server 131, the terminal device 111, and the public wireless LAN-AP 121. The public wireless LAN-AP 121 is classified into three types of AP1, AP2 and AP3 in the embodiment according to the authentication type, and in the flowchart, AP3 is described as another flow using a flow obtained by collecting AP1 and AP2. In the embodiment, there are three types illustrated in FIG. 3 as an authentication type. The authentication type (1) is an authentication type corresponding to the AP1-121*a*, and is for authenticating connection between the terminal device 111 and the AP1-121*a* by one-tap to be described later. The authentication type (2) is an authentication type corresponding to the AP2-121*b*, and is for authenticating connection between the terminal device 111 and the AP2-121*b* by registering an e-mail address to be described later. The authentication type (3) is an authentication type corresponding to AP3-121*c*, and is for authenticating connection between the terminal device 111 and the AP3-121*c* by performing membership registration to be described later.

In step S201, the terminal device 111 selects an SSID of a public wireless LAN-AP 121 and attempts to make a connection thereto. For example, based on the AP table stored in the terminal storage unit 114, the terminal device 111 is capable of selecting the SSID of the public wireless LAN-AP 121 having a strong radio wave intensity of the wireless LAN.

In step S202, the terminal device 111 transmits a check request for confirming whether the terminal device 111 and the public wireless LAN 121 have been authenticated, to the public wireless LAN-AP 121 to which the terminal device 111 attempts to make a connection.

In step S203 and step S205, the AP1-121*a* to AP3-121*c* determine whether or not the terminal device 111 desiring to authenticate connection has been authenticated with the access point. In a case where it is determined in step S203 that the terminal device 111 desiring connection to the AP1-121*a* or AP2-121*b* has been authenticated, the processing proceeds to step S217. In a case where it is determined that authentication is not completed, the processing proceeds to step S204. As in the case of step S205, in a case where it is determined that the terminal device 111 desiring connection to the AP3-121*c* has been authenticated, the processing proceeds to step S218. In a case where it is determined that authentication is not completed, the processing proceeds to step S206.

In step S204 and step S206, since it is determined that the terminal device 111 is not authenticated for each access point, authentication HTML from a redirect URL described in the AP table is transmitted to the terminal device 111. The authentication HTML is a form for authentication described in HTML, and describes information required when the terminal device 111 is connected to each access point.

In step S207, the terminal device 111 causes the terminal control unit 113 to perform analysis of authentication HTML that has been transmitted from each access point. The terminal control unit 113 performs analysis by decoding the description of the authentication HTML.

In step S208, the terminal device 111 determines an authentication type based on the analysis result of the authentication HTML performed in step S207. There are three types of authentication HTML transmitted from the AP1-121*a* and AP2-121*b* in step S204 and from AP3-121*c* in step S206. The authentication types are illustrated in FIG. 3, and the authentication step differs according to each type. In a case where the terminal control unit 113 determines that the analysis result of the authentication HTML is the authentication type (1), the processing proceeds to step S209. In a case where the terminal control unit 113 determines that the authentication HTML is the authentication type (2), the processing proceeds to step S210. In a case where the terminal control unit 113 determines that the authentication HTML is the authentication type (3), the processing proceeds to step S211.

In step S209, the authentication type (1) is the authentication HTML transmitted from the AP1-121*a*, and for example, is a type for performing authentication by one-taping a predetermined button on the screen of the smartphone. Therefore, the terminal control unit 113 selects the protocol of the authentication type (1) in FIG. 3 and transmits, to the AP1-121*a*, a one-tap signal in HTML format according to the protocol.

In step S210, the authentication type (2) is the authentication HTML transmitted from the AP2-121*b*, and is a type for performing authentication by transmitting e-mail address information to the AP2-121*b*. The e-mail address to be transmitted is an address generated when the authentication assist server 131 receives the transmission of user information from the terminal device 111, and is an assignment address of the user table DB in the table of FIG. 4(*a*). The terminal control unit 113 selects the protocol of the authentication type (2) in FIG. 3 and transmits, to the AP2-121*b*, the assignment address of the user table DB stored in the terminal storage unit 114 of the terminal device 111 in HTML format according to the protocol.

In step S211, the authentication type (3) is the authentication HTML transmitted from the AP3-121*c*, and is a type for performing authentication by transmitting membership registration information to the AP3-121*c*. The text data of authentication HTML is analyzed and necessary information is extracted. In this case, membership information to be transmitted is the user's birth date information, gender information, and e-mail address information. Therefore, the user information stored in the terminal storage unit 114 and the assignment address generated by the authentication assist server are transmitted as membership information from the terminal device 111 to the AP3-121*c*. The terminal control unit 113 selects the protocol of the authentication type (3) in FIG. 3 and transmits, to the AP3-121*c*, the user information and the assignment address of the user table DB stored in the terminal storage unit 114 of the terminal device 111 in HTML format according to the protocol.

In step S212, the AP3-121*c* issues authentication password information for the received membership information, and transmits the authentication password information to an e-mail address registered in the membership information.

The e-mail address is an assignment address generated by the authentication assist server 131, and e-mail is transmitted to the authentication assist server 131. That is, the authentication password information is transmitted to the authentication assist server 131.

In step S213, the authentication assist server 131 extracts authentication password information from information transmitted to the assignment address, and transmits the authentication password information to the terminal device 111. At this time, the terminal device 111 may communicate with the authentication assist server 131 through the mobile phone line-AP 122, or may communicate with the authentication assist server 131 using HTTPS before connection authentication, through the connected AP3-121c. Also, in the embodiment, the access point requests an authentication password, but in a case where the information transmitted to the assignment address is one-tap authentication, the authentication assist server 131 performs one-tap and transmission of information to the terminal device 111 may not be necessary. In this case, step S214 is skipped, and a one-tap signal from the authentication assist server may be processed as the completion of connection authentication when the one-tap signal is received by the AP3-121c.

In step S214, the terminal device 111 transmits, to the AP3-121c, the password information transmitted from the authentication assist server 131.

As described above, the method of performing authentication using an authentication protocol for each authentication type has been described.

Next, in step S215, the AP1-121a or AP2-121b determines whether the one-tap signal transmitted in step S209 is correct or the mail address information is correct for the AP1-121a or AP2-121b and confirms connection authentication. Whether the signal or the information is correct or not is comprehensively determined in accord with not only the contents of the signal or the information, but also the timing of transmission and reception of the signal or the information, and the form requested by the AP1-121a or AP2-121b, and so on. In the case where the one-tap signal or the e-mail address information is correct, it is determined that the confirmation of authentication is OK, and the processing proceeds to step S217. In a case where the one-tap signal or the e-mail address information is not correct, the confirmation of authentication is determined as NG, and the processing proceeds to step S218.

In step S216, the AP3-121c determines whether the authentication password information transmitted in step S214 is correct for the AP3-121c, and confirms connection authentication. Whether the information is correct or not is comprehensively determined in accord with not only the contents of the information, but also the timing of transmission and reception of the information, and the form requested by the AP3-121c, and so on. In a case where the authentication password information is correct, it is determined that the confirmation of authentication is OK, and the processing proceeds to step S218. In a case where the authentication password information is not correct, it is determined that the confirmation of authentication is OK, and the processing proceeds to step S219. Incidentally, by the same processing as that of step S216, it may be determined in step S211 whether to proceed with the authentication step based on the determination as to whether or not the membership information transmitted from the terminal device 111 is correct.

In step S217, the AP1-121a or AP2-121b notifies the terminal device 111 of permission for connection authentication.

In step S218, the AP3-121c notifies the terminal device 111 of permission for connection authentication.

In step S219, the terminal device 111 receives a notification of connection authentication from the AP1-121a or AP2-121b, or AP3-121c, and completes the authentication with the access point, thereby completing connection authentication between the terminal device 111 and each access point.

In step S220, the AP1-121a or AP2-121b notifies the terminal device 111 that connection authentication is not possible.

In step S221, the AP3-121c notifies the terminal device 111 that connection authentication is not possible.

In step S222, the terminal device 111 transmits the authentication log to the authentication assist server 131. The authentication log is record information of the authentication step performed by the terminal device 111 until now, and is stored in the terminal storage unit 114. The authentication log includes information as to whether authentication has been completed or whether authentication is not possible. Incidentally, in a case where authentication is not possible, communication may be performed through the mobile phone line-AP 122, and the authentication log may be stored in the terminal storage unit 114, and may be transmitted to the authentication assist server 131 when a connection to another public wireless LAN-AP 121 or wireless LAN-AP 123 is made.

In step S223, the authentication assist server 131 stores the transmitted authentication log in the server storage unit. Since the authentication log is confirmed, the authentication protocol responds correctly and it is possible to accumulate information on access points for which connection authentication becomes possible. Then, since the validity of the authentication protocol is confirmed, it is possible to improve the reliability of connection authentication. Also, since the authentication log such that connection authentication is not possible is confirmed, the authentication protocol is modified or added corresponding to an access point for which the connection authentication is not possible, and the information is fed back to the terminal device 111, thereby improving a possibility of the permission of connection authentication when the terminal device 111 is connected to the access point next time.

In a case where a provider operating the authentication assist server modifies or adds the authentication protocol to generate an updated authentication protocol, the updated authentication protocol may be transmitted from the authentication assist server to the terminal device 111. At this time, the updated authentication protocol may be transmitted to the terminal device 111, triggered by a fact that the terminal device 111 is connected to the network 141 for the first time after the updated authentication protocol is generated. Also, an application including the updated authentication protocol may be provided to an application server and newly downloaded to the terminal device 111, and the contents may be updated by updating the application.

<Description of Effect>

As described above, in the authentication assist system 1 according to the first embodiment of the invention, it is possible to authenticate connection of the terminal device 111 to access points of the AP1-121a, the AP2-121b, and the AP3-121c having different authentication types, without requiring an operation of the user. Also, in a case where connection authentication is not possible, information such as information on the access point for which the connection authentication is not possible and information on the type of authentication protocol is stored in the authentication assist server 131, so that the provider operating the authentication assist server is capable of changing or adding the authentication protocol based on that information. Since the provider operating the authentication assist server provides the terminal device 111 with the changed or added authentication protocol, it is possible to improve a possibility of the permission of connection authentication when the same terminal device 111 again attempts to make a connection to the access point for which authentication is not possible, or when another user's terminal device attempts to make a connection to the access point.

Incidentally, in the authentication assist system 1 according to the first embodiment of the invention, the authentication type is determined in step S208, and the terminal device automatically performs connection authentication according to the determination result. However, depending on the authentication type, connection authentication may be performed by a user operation. For example, there is a case where the terminal device 111 transmits a phone number of the terminal device 111 (for example, a smartphone) to the public wireless LAN-AP 121, and the public wireless LAN-AP 121 transmits an authentication code to the terminal device 111 by SMS (short mail message service) and performs connection authentication according to the authentication code. In that case, the authentication type may be selected in step S208, and a display promoting the user operation may be displayed on the terminal device 111.

Also, authentication types for which connection authentication may be automatically performed are not limited to authentication types (1), (2), and (3), and may include other types for which, for example, only gender information is registered, and the like. Also, the type of the authentication type is not limited to being selected from three types, and may be two types, or may be selected from four or more types.

(Method at the Time of Another Application Introduction)

Operations other than the operations described with reference to FIG. 2 when the application program is introduced to the terminal device 111 and the terminal device 111 is connected to the authentication assist server 131 for the first time will be described with reference to FIG. 6.

In step S111, a user of the terminal device 111 installs an application for using the terminal device 111 in the authentication assist system 1, on the terminal device 111. The user is capable of obtain an application by downloading the application from an application distribution server on the Internet to the terminal device 111. The terminal device 111 is connectable to the network 141 through the mobile phone line-AP 122 or the wireless LAN-AP 123. Therefore, the terminal device 111 is capable of downloading the application from the Internet. Also, the terminal device 111 is capable of communicating with the authentication assist server 131. The application is stored in the terminal storage unit 114 by the terminal control unit 113 from the network 141 through the terminal communication unit 112. The application includes authentication protocol information.

In step S112, the terminal control unit 133 transmits connectable AP list and the AP table DB information in FIG. 4(*b*) to the terminal device 111.

In step S113, the terminal control unit 113 stores, in the terminal storage unit 114, the AP table that has been transmitted from the authentication assist server 131 through the terminal communication unit 112.

In step S114, the user inputs user information requested by the application into the terminal device 111. The user information is information such as the user's birth date and gender. The user information may include information such as the user's name, e-mail address and passport information. The input user information is stored in the terminal storage unit 114.

In step S115, the terminal control unit 113 transmits the user information stored in the terminal storage unit 114 in step S102, to the authentication assist server 131 through the terminal communication unit 112.

In step S116, in the authentication assist server 131, the server control unit 133 generates a user table based on the user information transmitted from the terminal device 111, and stores the user table in the server storage unit 134. As illustrated in FIG. 4(*a*), the user table includes a user ID, user information transmitted from the terminal device 111, and assignment address information assigned by the server control unit to each user ID. The assignment address is an e-mail address corresponding to each user generated by the server control unit 133.

In step S117, the terminal control unit 133 transmits the user table DB information to the terminal device 111. The user table DB includes an assignment address generated by the server control unit, and the assignment address is stored in the terminal storage unit 114.

In step S118, the user selects a desired access point to be connected, from the AP list that has been transmitted from the authentication assist server 131.

In step S119, the terminal control unit 113 activates the corresponding AP table based on the AP list selected in step S118, and enables connection to the selected access point.

As described above, a method illustrated in FIG. 6 may be selected as procedures at the time of application introduction. The method may be correctly selected according to the type and the like of OS (Operating System) mounted on the terminal device 111.

Second Embodiment

Next, the second embodiment of the invention will be described. The second embodiment is a system different from the first embodiment in that operations corresponding to the case where the terminal device 111 is connected to the access point 121 having no record of completion of connection authentication are included.

<Configuration>

In the second embodiment with reference to FIG. 7, the configuration and outline of an authentication assist system 2 including an authentication assist server 131 for assisting connection authentication of a terminal device to a public wireless LAN access point (hereinafter, referred to as a public wireless LAN-AP) will be described. Incidentally, FIG. 7 is a schematic block diagram of the authentication assist system 2 of this embodiment.

Figure 7:
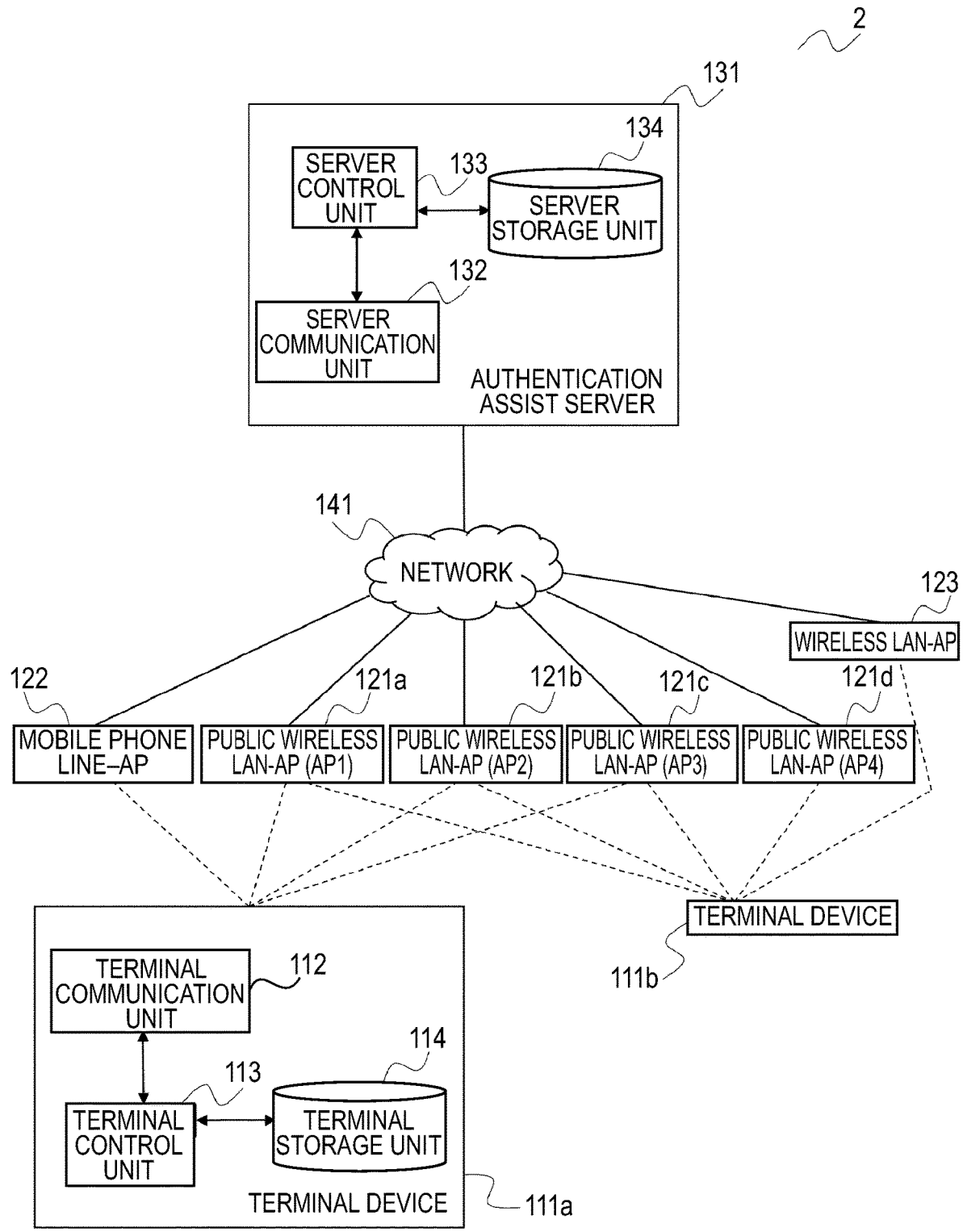
FIG. 7 is a schematic block diagram illustrating a configuration of an authentication assist system according to a second embodiment.

As illustrated in FIG. 7, the authentication assist system 2 of the embodiment includes public wireless LAN-APs 121*a* to 121*d* (hereinafter, collectively referred to as public wireless LAN-AP 121) and mobile phone line access point 122 (hereinafter, referred to as mobile phone line-AP 122), a wireless LAN access point 123 (hereinafter, referred to as a wireless LAN-AP 123) installed in homes and the like, and an authentication assist server 131 that are configured to be connectable to a network 141 such as the Internet. The terminal devices 111*a* and 111*b* (hereinafter, collectively referred to as the terminal device 111) are capable of being connected to the network 141 through the public wireless LAN-AP 121, the mobile phone line-AP 122, and the wireless LAN-AP 123.

The terminal device 111 is a terminal device capable of communicating with the Internet or the like. The terminal device 111 is connected to the network 141 such as the Internet through the public wireless LAN-AP 121, the mobile phone line-AP 122, or the wireless LAN-AP 123. The terminal device 111 includes a terminal communication unit 112, a terminal control unit 113, and a terminal storage unit 114.

The terminal device 111 is an information processing device such as a smartphone, a mobile phone, a PHS, a computer, a game device, a PDA, a watch, a smartwatch, a head mounted display, an image generation device, and is a device connectable to the authentication assist server 131 through the network 141.

The terminal communication unit 112 is a communication interface that communicates with the authentication assist server 131, the public wireless LAN-AP 121, or the like through the network 141. Also, the terminal communication unit, receives an application program for assisting connection of the terminal device 111 to the public wireless LAN-AP, and transmits information to the authentication assist server 131. Also, authentication HTML that is authentication information transmitted from the public wireless LAN-AP is received.

The terminal control unit 113 attempts to connect the terminal device to the public wireless LAN-AP according to the AP table, performs analysis of the authentication HTML, or identifies a type. Also, the log of the process of connection authentication is generated, stored in the terminal storage unit 114, and transmitted to the authentication assist server 131.

The terminal storage unit 114 stores an application program (hereinafter, referred to as an application) for using the terminal device 111 in the authentication assist system 1, user information, password information for authentication, an AP list that is a list of access points to which the terminal device 111 is connectable, or an AP table. Also, the log of the process of connection authentication that has been generated by the terminal control unit is stored.

The public wireless LAN-AP 121 is a wireless LAN access point installed in public areas such as convenience stores, cafes, hotels, and airports, and is accessible by various users as a public line. The wireless LAN-AP in the embodiment does not indicate only installed access points, but also includes other infrastructure facilities such as an authentication server required for its use. The public wireless LAN-AP is connected to the Internet and the like, and it is possible to connect the terminal device 111 to the Internet and the like by performing connection authentication of the terminal device 111 to the public wireless LAN-AP. The public wireless LAN-AP 121 is classifiable into several types according to a connection authentication type of the user. In the embodiment, the public wireless LAN-AP 121a, the public wireless LAN-AP 121b, the public wireless LAN-AP 121c, and the public wireless LAN-AP 121d in FIG. 1 will be described as four types of AP1-121a, AP2-121b, AP3-121c, and AP4-121d.

The mobile phone line-AP 122 is an access point for connecting a mobile phone line for voice communication such as a mobile phone or a smartphone or a mobile phone line mobile broadband, and includes a radio wave base station and the like. The mobile phone line-AP in the embodiment does not indicate only installed access points, but also includes other infrastructure facilities such as an authentication server required for its use. The mobile phone line-AP is connected to the Internet and the like through each mobile phone provider, and it is possible to connect the terminal device 111 to the Internet and the like by performing the connection authentication of the terminal device 111 to the mobile phone line-AP. Incidentally, the mobile phone line is not limited to a 3G network, a 4G network, and a LTE network, and may be a network provided by a mobile phone provider or the like.

For example, the wireless LAN-AP 123 indicates a wireless LAN access point used by a specific person at a home or an office. The wireless LAN-AP in the embodiment does not indicate only installed access points, but also includes other infrastructure facilities such as an authentication server of an Internet provider and the like required for its use. In a case where the terminal device 111 is used in homes or the like, it is possible to connect the terminal device 111 to the Internet or the like through the wireless LAN-AP.

The authentication assist server 131 is a server that provides information for assisting connection of the terminal device 111 to the public wireless LAN-AP 121. The authentication assist server 131 includes a server communication unit 132, a server control unit 133, and a server storage unit 134.

The server communication unit 132 is a communication interface that communicates with the terminal device 111 through the network 141. The server communication unit 132 receives a request signal from the terminal device 111 and transmits information to the terminal device 111.

The server control unit 133 generates a user table DB from user information that has been transmitted from the terminal device 111, and stores the user table DB in the server storage unit 134 or transmits, to the terminal device 111, the AP list or the AP table stored in the server storage unit 134 to be described later, in response to a request from the terminal device 111.

The server storage unit 134 stores the user table DB including user information of a user who uses the terminal device and being generated by the server control unit 133, an AP list DB that is a list of access points to which the terminal device 111 is connectable, or an AP table DB including individual information of access points. Furthermore, an authentication log recording the process of the connection authentication, which has been transmitted from the terminal device 111, is stored.

<Flow of Processing>

Figure 8:
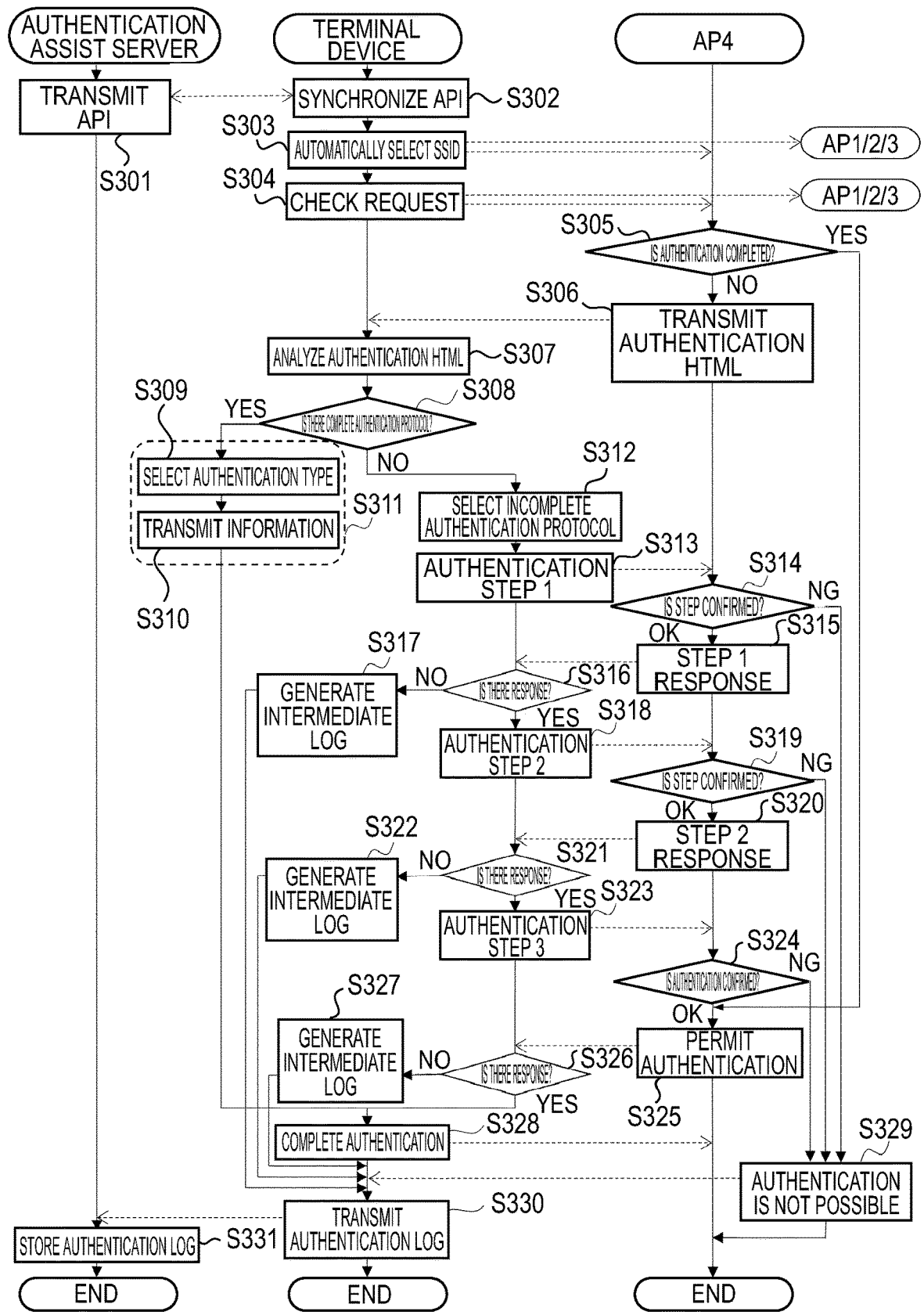
FIG. 8 is a flowchart for describing operations of a terminal device, a public wireless LAN-AP, and an authentication assist server according to the second embodiment.

The operations of the authentication assist server 131, the terminal device 111, and the public wireless LAN-AP 121 in the authentication assist system 2 according to the second embodiment of the invention will be described with reference to the flowchart illustrated in FIG. 8. FIG. 8 is a flowchart illustrating operations when the terminal device 111 is connected to the public wireless LAN-AP 121, and illustrates a related state of each operation among the authentication assist server 131, the terminal device 111 and the public wireless LAN-AP 121.

(At the Time of Application Introduction)

Figure 6:
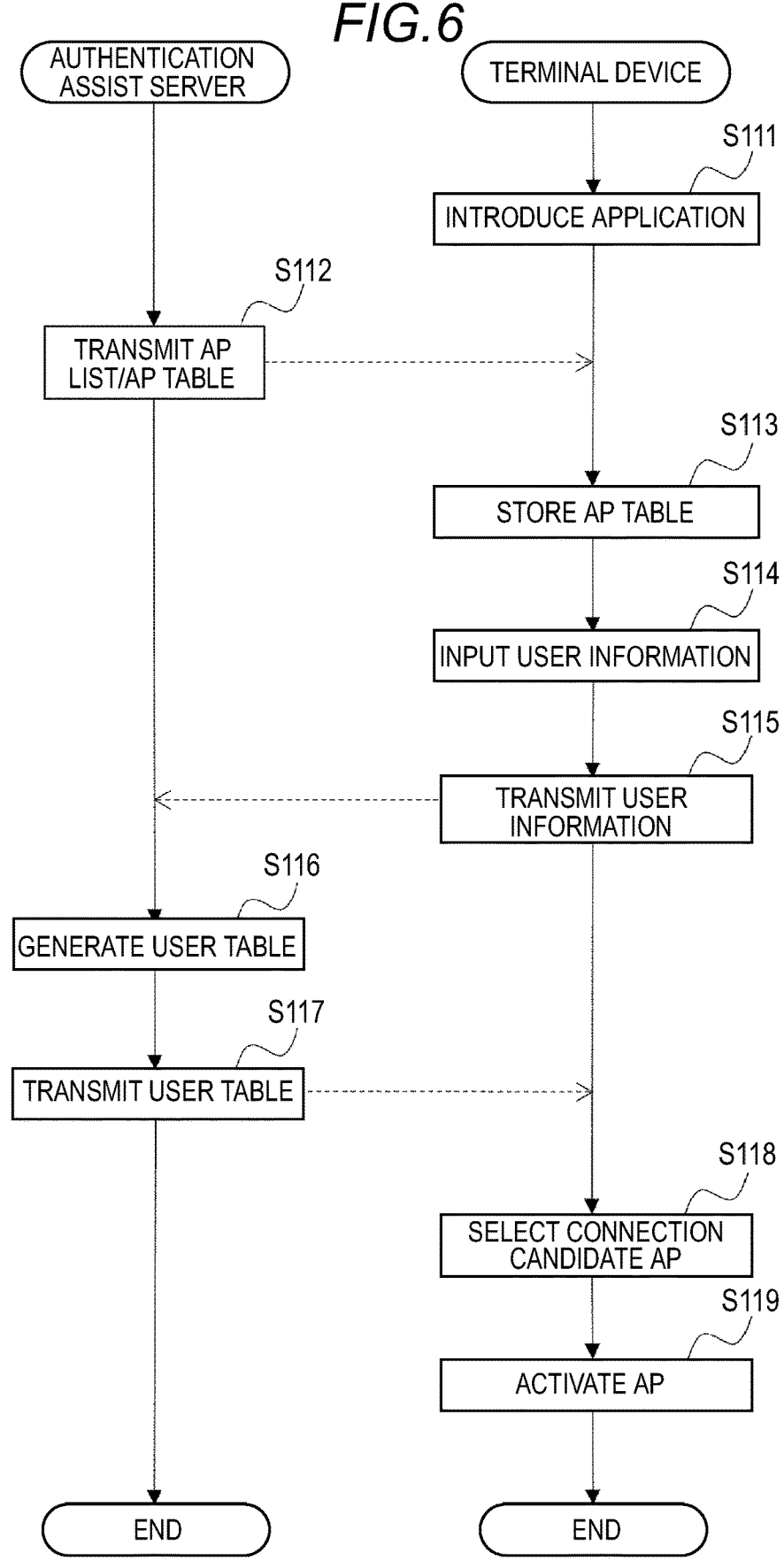
FIG. 6 is a flowchart for describing operations of the terminal device and the authentication assist server according to the first embodiment.

Either operations illustrated in FIG. 2 or operations illustrated in FIG. 6 in the first embodiment may be used as the operations when the application program is introduced to the terminal device 111 and the terminal device 111 is connected to the authentication assist server 131 for the first time.

(At the Time of Access Point Connection)

Operations when the terminal device 111 is connected to the public wireless LAN-AP 121 will be described with reference to FIG. 8. The flowchart in FIG. 8 illustrates the related state of each operation among the authentication assist server 131, the terminal device 111, and the public wireless LAN-AP 121. The public wireless LAN-AP 121 is classified into three types of AP1, AP2, and AP3 as described in the first embodiment according to the authentication type. AP4 is an access point having different authentication type.

Although AP1 to AP3 is separate from AP4 in description of the flowchart, for AP1 to AP3, the same operations as in the first embodiment are performed except for the operation of step S308. Therefore, hereinafter, the operation of connecting the terminal device 111 to the AP4 will be mainly described.

In step S301, the authentication assist server 131 communicates with the terminal device 111 to synchronize an authentication protocol. The authentication protocol is provided in the form of an Application Programming Interface (API). The authentication assist server 131 transmits the latest API to the terminal device 111, in response to a request from the terminal device 111. Also, the authentication protocol includes a complete authentication protocol and an incomplete authentication protocol. The complete authentication protocol is a protocol in which an authentication step describes steps until connection authentication completion. The incomplete authentication protocol is a protocol in which an authentication step describes steps that have not reached completion of connection authentication, and also includes information that there is no authentication protocol information.

In step S302, the terminal device 111 communicates with the authentication assist server 131 to synchronize the API. The terminal control unit 113 of the terminal device 111 compares the API stored in the server storage unit 134 with the API stored in the terminal storage unit 114, and the API is transmitted to the terminal device 111 in a case where the API stored in the server storage unit 134 is new. Thereby, the terminal device 111 is capable of maintaining the authentication protocol in the latest state.

In step S303, the terminal device 111 selects the SSID of the public wireless LAN-AP 121 and attempts to make a connection thereto. For example, the terminal device 111 is capable of selecting the SSID of the public wireless LAN-AP 121 having a strong radio wave intensity of the wireless LAN.

In step S304, the terminal device 111 transmits a check request for confirming whether the terminal device 111 and the public wireless LAN 121 have been authenticated, to the public wireless LAN-AP 121 to which the terminal device 111 attempts to make a connection.

In step S305, the AP4-121d determines whether or not the terminal device 111 desiring to authenticate connection has been authenticated with the access point. In a case where it is determined that the terminal device 111 desiring connection to the AP4-121d has been authenticated, the processing proceeds to step S325. In a case where it is determined that authentication is not completed, the processing proceeds to step S306.

In step S306, since it is determined that the terminal device 111 has not been authenticated for the access point, the authentication HTML is transmitted to the terminal device 111. The authentication HTML is a form for authentication described in Hyper Text Markup Language (HTML), and describes information required when the terminal device 111 is connected to each access point.

In step S307, the terminal device 111 causes the terminal control unit 113 to perform analysis of authentication HTML that has been transmitted from each access point. The terminal control unit 113 performs analysis by decoding the description of the authentication HTML.

In step S308, the terminal device 111 determines a presence or absence of the corresponding complete authentication protocol based on the analysis result of the authentication HTML. In a case where there is a complete authentication protocol, the processing proceeds to step S309. In a case where there is no complete authentication protocol, the processing proceeds to step S312.

Step S309 and step S310 are collectively referred to as step S311. Authentication type selection in step S309 and information transmission in step S310 correspond to step S208 and steps S209 to S214 of the flowchart (FIG. 5) in the first embodiment. That is, step S311 indicates operations in the first embodiment, and in the case where there is a complete authentication protocol, connection authentication between the terminal device 111 and the public wireless LAN-AP 121 is performed by operations in the first embodiment.

In step S312, an incomplete authentication protocol close to the authentication type is selected based on the analysis result of the authentication HTML in step S307. In the embodiment, the incomplete authentication protocol will be described by taking an example in which the operation up to authentication step 2 is described. Also, in the following description, although a case where connection authentication is performed in three stages from authentication steps 1 to 3 is taken as an example, the stages and contents of the authentication step are correctly changed depending on the type of public wireless LAN-AP.

In step S313, it is performed to proceed with the authentication step 1 according to the incomplete authentication protocol. The authentication step 1 is, for example, an operation of tapping a check of the terms of service. The operation is transmitted to AP4-121d in HTML. In a case where the operation of the authentication step 1 is not in accord with the incomplete authentication protocol, the terminal device 111 may estimate an input part of an operation of tapping the check of the terms of service from the analysis result of the authentication HTML, and may perform the operation.

In step S314, it is confirmed whether or not the authentication step 1 performed in step S313 is compatible with the authentication step requested by the AP4-121d. In a case where the result of confirmation is OK, the processing proceeds to step S315. In a case where the result of confirmation is NG, the processing proceeds to step S329.

In step S315, the AP4-121d makes a response for the operation of the authentication step 1 to the terminal device 111. The response makes a request for the next authentication step in HTML.

In step S316, the terminal device 111 determines whether or not there is a response from the AP4-121d with respect to the operation of the authentication step 1 in step S313. In determination, in a case where there is a response within a predetermined time, it may be determined that there is a response, and it may be determined that there is no response, by a notification from the AP4-121d indicating that step confirmation is not possible. In a case where it is determined that there is no response, the processing proceeds to step S317. In a case where it is determined that there is a response, the processing proceeds to step S318.

In step S317, since authentication by the operation of the authentication step 1 of the terminal device 111 is not possible, an intermediate log is generated for the authentication operation up to this point, and is stored in the terminal storage unit 114. From the intermediate log, it is possible to analyze that the authentication is not possible in the authentication step 1.

In step S318, it is performed to proceed with the authentication step 2 according to the incomplete authentication protocol. The authentication step 2 is, for example, an operation of inputting the user's e-mail address and transmitting the e-mail address to the access point. The e-mail address is transmitted to AP4-121d in HTML. In a case where the operation of the authentication step 2 is not in accord with the incomplete authentication protocol, the terminal device 111 may estimate an input part of an operation of inputting the user's e-mail address from the analysis result of the authentication HTML and transmitting the e-mail address to the access point, and may perform the operation.

In step S319, it is confirmed whether or not the authentication step 2 performed in step S318 is compatible with the authentication step requested by the AP4-121d. In a case where the result of confirmation is OK, the processing proceeds to step S320. In a case where the result of confirmation is NG, the processing proceeds to step S329.

In step S320, the AP4-121d makes a response for the operation of the authentication step 2 to the terminal device 111. The response makes a request for the next authentication step in HTML.

In step S321, the terminal device 111 determines whether or not there is a response from the AP4-121d with respect to the operation of the authentication step 2 in step S318. In determination, as in the case of step S316, in a case where there is a response within a predetermined time, it may be determined that there is a response, and it may be determined that there is no response, by a notification from the AP4-121d indicating that step confirmation is not possible. In a case where it is determined that there is no response, the processing proceeds to step S322. In a case where it is determined that there is a response, the processing proceeds to step S323.

In step S322, since authentication by the operation of the authentication step 2 of the terminal device 111 is not possible, an intermediate log is generated for the authentication operation up to this point, and is stored in the terminal storage unit 114. From the intermediate log, it is possible to analyze that the authentication is not possible in the authentication step 2.

In step S323, the terminal device 111 proceeds with the authentication step 3. The authentication step 3 is, for example, an operation of tapping a check on the final confirmation of intention to use. In the embodiment, the incomplete authentication protocol is description up to the authentication step 2. Therefore, in a case where the terminal device 111 finds the description of the input request from the analysis result of the authentication HTML, the terminal device 111 estimates the input part of the operation of tapping a check on the final confirmation of intention to use, performs the corresponding operation, and transmits the operation to the AP4-121d in HTML.

In step S324, it is confirmed whether or not the authentication step 3 performed in step S323 is compatible with the authentication step requested by the AP4-121d. In a case where the result of confirmation is OK, it is determined that the final authentication step is OK, the confirmation of authentication is OK, and the processing proceeds to step S325. In a case where the result of confirmation is NG, the processing proceeds to step S329.

In step S325, the AP4-121d notifies the terminal device 111 of permission of connection authentication.

In step S326, the terminal device 111 determines whether or not there is a response from the AP4-121d with respect to the operation of the authentication step 3 in step S323. In determination, as in the case of step S316, in a case where there is a response within a predetermined time, it may be determined that there is a response, and it may be determined that there is no response, by a notification from the AP4-121d indicating that step confirmation is not possible. In a case where it is determined that there is no response, the processing proceeds to step S327. In a case where it is determined that there is a response, the processing proceeds to step S328.

In step S327, since the authentication by the operation of the authentication step 3 of the terminal device 111 is not possible, an intermediate log is generated for the authentication operation up to this point, and is stored in the terminal storage unit 114. From the intermediate log, it is possible to analyze that the authentication is not possible in the authentication step 3.

In step S328, the terminal device 111 receives a notification of connection authentication from the AP4-121d, and completes the authentication with the access point, thereby completing connection authentication between the terminal device 111 and the AP4-121d.

In step S329, the AP4-121d notifies the terminal device 111 that connection authentication is not possible.

In step S330, the terminal device 111 transmits an authentication log to the authentication assist server 131. The authentication log includes the record information of the authentication step performed by the terminal device 111 until now, or the intermediate log in a case where authentication is not possible, and is stored in the terminal storage unit 114. The authentication log includes information as to whether authentication has been completed or whether authentication is not possible. Incidentally, in the case where authentication is not possible, communication may be performed through the mobile phone line-AP 122, and the authentication log may be stored in the terminal storage unit 114, and may be transmitted to the authentication assist server 131 when a connection to another public wireless LAN-AP 121 or wireless LAN-AP 123 is performed.

In step S331, the authentication assist server 131 stores the transmitted authentication log in the server storage unit. Since the authentication assist server confirms the authentication log including an intermediate log, the authentication assist server is capable of generating the updated authentication protocol corresponding to the authentication step that is not possible, from information as to which stage of the authentication step is not possible. Since the updated authentication protocol is fed back to the terminal device 111, when the terminal device 111 is connected to the access point next time, the terminal device 111 receives the permission of authentication in the authentication step that is not possible, and it is possible to improve a possibility of the permission of connection authentication between the terminal device 111 and the public wireless LAN-AP 121, finally. In a case where the generated authentication protocol has reached completion of connection authentication, the authentication protocol is stored in the server storage unit 134 as a complete authentication protocol, and in a case where the generated authentication protocol has not reached completion of connection authentication, the authentication protocol is stored in the server storage unit 134 as an incomplete authentication protocol.

In a case where the provider operating the authentication assist server generates the updated authentication protocol, the updated authentication protocol is stored in the server storage unit 134. In step S301 and step S302, the authentication protocol is synchronized in the form of an API between the terminal device 111 and the authentication assist server 131. Incidentally, in the embodiment, although the authentication protocol is synchronized with the terminal device 111 in the form of API in step S301 and step S302, an application including the updated authentication protocol may be provided to the application server and newly download to the terminal device 111, and the contents may be updated by updating the application.

<Description of Effect>

As described above, in the authentication assist system 2 according to the second embodiment of the invention, since the terminal device 111 proceeds with the authentication step even for an access point having no record of completion of connection authentication, it is possible to provide a system capable of improving the possibility of connection authentication. Since the incomplete authentication protocol is used, it is possible to proceed with authentication step up to authentication step before the authentication is not possible even for the access point for which the connection authentication was attempted in the past and the authentication was not possible, and complete the authentication step, thereby improving a possibility of completing connection authentication.

Third Embodiment

Next, the third embodiment of the invention will be described. The third embodiment is a system different from the second embodiment in that the authentication assist server is involved in real time in operations corresponding to the case where the terminal device 111 is connected to the access point 121 having no record of completion of connection authentication. Incidentally, the entire system of the third embodiment is the same as that of FIG. 7 described in the second embodiment, and the reference numerals and the like in the following description are the same.

Figure 9:
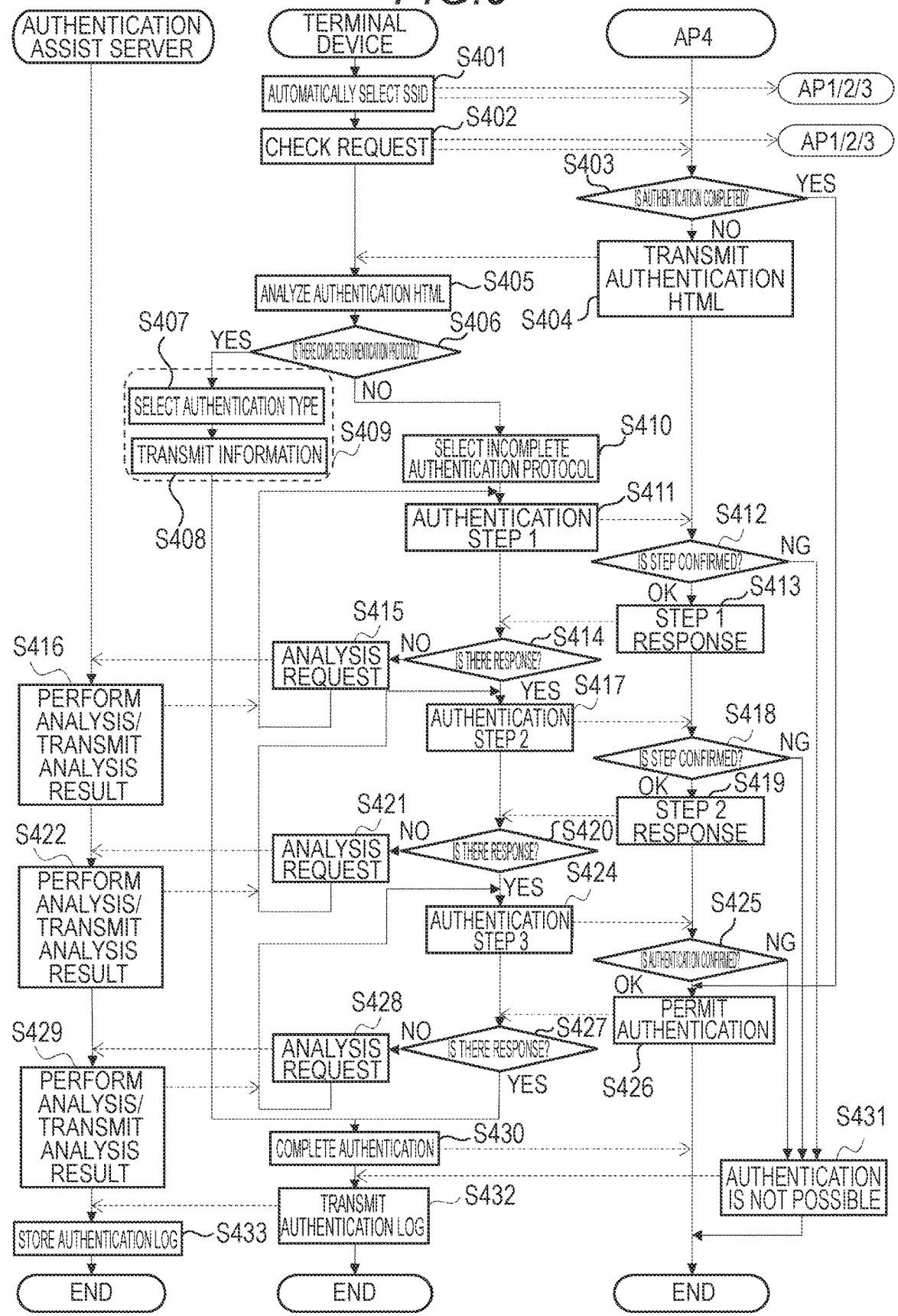
FIG. 9 is a flowchart for describing operations of a terminal device, a public wireless LAN-AP, and an authentication assist server according to a third embodiment.

The operations of the authentication assist server 131, the terminal device 111, and the public wireless LAN-AP 121 in the authentication assist system 2 according to the third embodiment of the invention will be described with reference to the flowchart illustrated in FIG. 9. FIG. 9 is a flowchart illustrating operations when the terminal device 111 is connected to the public wireless LAN-AP 121, and illustrates a related state of each operation among the authentication assist server 131, the terminal device 111, and the public wireless LAN-AP 121.

(At the Time of Application Introduction)

Either operations illustrated in FIG. 2 or operations illustrated in FIG. 6 in the first embodiment may be used as the operations when the application program is introduced to the terminal device 111 and the terminal device 111 is connected to the authentication assist server 131 for the first time.

(At the Time of Access Point Connection)

Operations when the terminal device 111 is connected to the public wireless LAN-AP 121 will be described with reference to FIG. 9. The flowchart in FIG. 9 illustrates the related state of each operation among the authentication assist server 131, the terminal device 111, and the public wireless LAN-AP 121. The public wireless LAN-AP 121 is classified into three types of AP1, AP2, and AP3 as described in the first embodiment according to the authentication type. AP4 is an access point having different authentication type. Although AP1 to AP3 is separate from AP4 in description of the flowchart, for AP1 to AP3, the same operations as in the first embodiment are performed except for the operation of step S406. Therefore, hereinafter, the operation of connecting the terminal device 111 to the AP4 will be mainly described.

In step S401, the terminal device 111 selects the SSID of the public wireless LAN-AP 121 and attempts to make a connection thereto. For example, the terminal device 111 is capable of selecting the SSID of the public wireless LAN-AP 121 having a strong radio wave intensity of the wireless LAN.

In step S402, the terminal device 111 transmits a check request for confirming whether the terminal device 111 and the public wireless LAN 121 have been authenticated, to the public wireless LAN-AP 121 to which the terminal device 111 attempts to make a connection.

In step S403, the AP4-121d determines whether or not the terminal device 111 desiring to authenticate connection has been authenticated with the access point. In a case where it is determined that the terminal device 111 desiring connection to the AP4-121d has been authenticated, the processing proceeds to step S431. In a case where it is determined that authentication is not completed, the processing proceeds to step S404.

In step S404, since it is determined that the terminal device 111 has not been authenticated for the access point, the authentication HTML is transmitted to the terminal device 111. The authentication HTML is a form for authentication described in Hyper Text Markup Language (HTML), and describes information required when the terminal device 111 is connected to each access point.

In step S405, the terminal device 111 causes the terminal control unit 113 to perform analysis of authentication HTML that has been transmitted from each access point. The terminal control unit 113 performs analysis by decoding the description of the authentication HTML.

In step S406, the terminal device 111 determines a presence or absence of the corresponding complete authentication protocol based on the analysis result of the authentication HTML. In a case where there is a complete authentication protocol, the processing proceeds to step S309. In a case where there is no complete authentication protocol, the processing proceeds to step S312.

Step S407 and step S408 are collectively referred to as step S409. Authentication type selection in step S407 and information transmission in step S408 correspond to step S208 and steps S209 to S214 of the flowchart (FIG. 5) in the first embodiment. That is, step S409 indicates operations in the first embodiment, and in the case where there is a complete authentication protocol, connection authentication between the terminal device 111 and the public wireless LAN-AP 121 is performed by operations in the first embodiment.

In step S410, an incomplete authentication protocol close to the authentication type is selected based on the analysis result of the authentication HTML in step S405. In the embodiment, the incomplete authentication protocol will be described by taking an example in which the operation up to authentication step 2 is described. Also, in the following description, although a case where connection authentication is performed in three stages from authentication steps 1 to 3 is taken as an example, the stages and contents of the authentication step are correctly changed depending on the type of public wireless LAN-AP.

In step S411, it is performed to proceed with the authentication step 1 according to the incomplete authentication protocol. The authentication step 1 is, for example, an operation of tapping a check of the terms of service. The operation is transmitted to AP4-121d in HTML. In a case where the operation of the authentication step 1 is not in accord with the incomplete authentication protocol, the terminal device 111 may estimate an input part of an operation of tapping the check of the terms of service from the analysis result of the authentication HTML, and may perform the operation.

In step S412, it is confirmed whether or not the authentication step 1 performed in step S411 is compatible with the authentication step requested by the AP4-121d. In a case where the result of confirmation is OK, the processing proceeds to step S413. In a case where the result of confirmation is NG, the processing proceeds to step S431.

In step S413, the AP4-121d makes a response for the operation of the authentication step 1 to the terminal device 111. The response makes a request for the next authentication step in HTML.

In step S414, the terminal device 111 determines whether or not there is a response from the AP4-121d with respect to the operation of the authentication step 1 in step S411. In determination, in a case where there is a response within a predetermined time, it may be determined that there is a response, and it may be determined that there is no response, by a notification from the AP4-121d indicating that step confirmation is not possible. In a case where it is determined that there is no response, the processing proceeds to step S415. In a case where it is determined that there is a response, the processing proceeds to step S417.

In step S415, since the authentication by the operation of the authentication step 1 of the terminal device 111 is not possible, the terminal device 111 makes an analysis request of the authentication step to the authentication assist server 131. Specifically, the terminal device 111 transmits, to the authentication assist server 131, the authentication HTML transmitted from the AP4-121d in step S404. At this time, the terminal device 111 may communicate with the authentication assist server 131 through the mobile phone line-AP 122, and may communicate with the authentication assist server 131 using HTTPS before connection authentication, through the connected AP4-121d.

In step S416, the authentication assist server 131 performs analysis of the authentication step, in response to the analysis request of the authentication step from the terminal device 111. Specifically, the authentication assist server 131 causes the server control unit 133 to perform analysis by decoding the description of the authentication HTML transmitted from the terminal device 111. As a result of the analysis, operation information that seems to be able to proceed with the authentication step 1 is transmitted to the terminal device 111. Also, the operation information is stored in the server storage unit 134 as incomplete authentication protocol information with access point information (in this case, the SSID of the AP4-121d or the like) added. Upon receiving the operation information, the processing returns to step S411, and the operation of the authentication step 1 is performed based on the operation information. Therefore, it is possible to improve a possibility of proceeding with the authentication step 1. Incidentally, the operation information is part of the incomplete authentication protocol and is stored in the terminal storage unit 114.

In step S417, it is performed to proceed with the authentication step 2 according to the incomplete authentication protocol. The authentication step 2 is, for example, an operation of inputting the user's e-mail address and transmitting the e-mail address to the access point. The e-mail address is transmitted to AP4-121d in HTML. In a case where the operation of the authentication step 2 is not in accord with the incomplete authentication protocol, the terminal device 111 may estimate an input part of an operation of inputting the user's e-mail address from the analysis result of the authentication HTML and transmitting the e-mail address to the access point, and may perform the operation.

In step S418, it is confirmed whether or not the authentication step 2 performed in step S417 is compatible with the authentication step requested by the AP4-121d. In a case where the result of confirmation is OK, the processing proceeds to step S419. In a case where the result of confirmation is NG, the processing proceeds to step S431.

In step S419, the AP4-121d makes a response for the operation of the authentication step 2 to the terminal device 111. The response makes a request for the next authentication step in HTML.

In step S420, the terminal device 111 determines whether or not there is a response from the AP4-121d with respect to the operation of the authentication step 2 in step S417. In determination, as in step S414, in a case where there is a response within a predetermined time, it may be determined that there is a response, and it may be determined that there is no response, by a notification from the AP4-121d indicating that step confirmation is not possible. In a case where it is determined that there is no response, the processing proceeds to step S421. In a case where it is determined that there is a response, the processing proceeds to step S424.

In step S421, since the authentication by the operation of the authentication step 2 of the terminal device 111 is not possible, the terminal device 111 makes an analysis request of the authentication step to the authentication assist server 131. Specifically, the terminal device 111 transmits, to the authentication assist server 131, the HTML of the step 1 response transmitted from the AP4-121d in step S413. At this time, the terminal device 111 may communicate with the authentication assist server 131 through the mobile phone line-AP 122, and may communicate with the authentication assist server 131 using HTTPS before connection authentication, through the connected AP4-121d.

In step S422, the authentication assist server 131 performs analysis of the authentication step, in response to the analysis request of the authentication step from the terminal device 111. Specifically, the authentication assist server 131 causes the server control unit 133 to perform analysis by decoding the description of the authentication HTML transmitted from the terminal device 111. As a result of the analysis, operation information that seems to be able to proceed with the authentication step 2 is transmitted to the terminal device 111. Also, the operation information is stored in the server storage unit 134 as incomplete authentication protocol information with access point information (in this case, the SSID of the AP4-121d or the like) added. Upon receiving the operation information, the processing returns to step S417, and the operation of the authentication step 2 is performed based on the operation information. Therefore, it is possible to improve a possibility of proceeding with the authentication step 2. Incidentally, the operation information is part of the incomplete authentication protocol and is stored in the terminal storage unit 114.

In step S424, the terminal device 111 proceeds with the authentication step 3. The authentication step 3 is, for example, an operation of tapping a check on the final confirmation of intention to use. In the embodiment, the incomplete authentication protocol is description up to the authentication step 2. Therefore, in a case where the terminal device 111 finds the description of the input request from the analysis result of the authentication HTML, the terminal device 111 estimates the input part of the operation of tapping a check on the final confirmation of intention to use, performs the corresponding operation, and transmits the operation to the AP4-121d in HTML.

In step S425, it is confirmed whether or not the authentication step 3 performed in step S424 is compatible with the authentication step requested by the AP4-121*d*. In a case where the result of confirmation is OK, it is determined that the final authentication step is OK, the confirmation of authentication is OK, and the processing proceeds to step S426. In a case where the result of confirmation is NG, the processing proceeds to step S431.

In step S426, the AP4-121*d* notifies the terminal device 111 of permission of connection authentication.

In step S427, the terminal device 111 determines whether or not there is a response from the AP4-121*d* with respect to the operation of the authentication step 3 in step S424. In determination, as in step S414, in a case where there is a response within a predetermined time, it may be determined that there is a response, and it may be determined that there is no response, by a notification from the AP4-121*d* indicating that step confirmation is not possible. In a case where it is determined that there is no response, the processing proceeds to step S428. In a case where it is determined that there is a response, the processing proceeds to step S430.

In step S428, since the authentication by the operation of the authentication step 3 of the terminal device 111 is not possible, the terminal device 111 makes an analysis request of the authentication step to the authentication assist server 131. Specifically, the terminal device 111 transmits, to the authentication assist server 131, the HTML of the step 2 response transmitted from the AP4-121*d* in step S419. At this time, the terminal device 111 may communicate with the authentication assist server 131 through the mobile phone line-AP 122, and may communicate with the authentication assist server 131 using HTTPS before connection authentication, through the connected AP4-121*d*.

In step S429, the authentication assist server 131 performs analysis of the authentication step, in response to the analysis request of the authentication step from the terminal device 111. Specifically, the authentication assist server 131 causes the server control unit 133 to perform analysis by decoding the description of the authentication HTML transmitted from the terminal device 111. As a result of the analysis, operation information that seems to be able to proceed with the authentication step 3 is transmitted to the terminal device 111. Also, the operation information is stored in the server storage unit 134 as incomplete authentication protocol information with access point information (in this case, the SSID of the AP4-121*d* or the like) added. Upon receiving the operation information, the processing returns to step S424, and the operation of the authentication step 3 is performed based on the operation information. Therefore, it is possible to improve a possibility of proceeding with the authentication step 3. Incidentally, the operation information is part of the incomplete authentication protocol and is stored in the terminal storage unit 114.

In step S430, the terminal device 111 receives a notification of connection authentication from the AP4-121*d*, and completes the authentication with the access point, thereby completing connection authentication between the terminal device 111 and the AP4-121*d*.

In step S431, the AP4-121*d* notifies the terminal device 111 that connection authentication is not possible.

In step S432, the terminal device 111 transmits an authentication log to the authentication assist server 131. The authentication log includes the record information of the authentication step performed by the terminal device 111 until now, or the intermediate log in a case where authentication is not possible, and is stored in the terminal storage unit 114. The authentication log includes information as to whether authentication has been completed or whether authentication is not possible. Incidentally, in the case where authentication is not possible, communication may be performed through the mobile phone line-AP 122, and the authentication log may be stored in the terminal storage unit 114, and may be transmitted to the authentication assist server 131 when a connection to another public wireless LAN-AP 121 or wireless LAN-AP 123 is performed.

In step S433, the authentication assist server 131 stores the transmitted authentication log in the server storage unit. Thereby, it is possible to accumulate information as to whether connection authentication has been completed or whether connection authentication is not possible.

<Description of Effect>

As described above, in the authentication assist system 3 according to the third embodiment of the invention, since the terminal device 111 proceeds with the authentication step even for an access point having no record of completion of connection authentication by performing timely access between the terminal device 111 and the authentication assist server 131, it is possible to provide a system capable of improving the possibility of connection authentication. Therefore, it is possible to improve the possibility of completing connection authentication by one connection even for an access point having no record of completion of connection authentication, and it is possible to greatly improve the convenience.

Also, in the authentication assist server 131, a complete authentication protocol or an incomplete authentication protocol according to the analysis result is generated and included in the updated authentication protocol. Therefore, when the terminal device is connected to the access point or when another user is connected to the access point, it is possible to rapidly perform connection authentication by sharing these authentication protocol. In a case where the updated authentication protocol is generated, the updated authentication protocol is stored in the server storage unit 134. The updated authentication protocol may perform synchronization in the form of an API between the terminal device 111 and the authentication assist server 131. Also, an application including the updated authentication protocol may be provided to an application server and newly downloaded to the terminal device 111, and the contents may be updated by updating the application.

The analysis of the authentication step by the authentication assist server 131 performed in step S416, step S422, and step S429 may be performed using machine learning or AI (artificial intelligence). In that case, it is possible to use the same analysis case in the past. For example, it is possible to perform the processing such as excluding the URL from the redirect candidates, in a case where there is no response to the once redirected URL. By performing operations in this way, information on how to proceed with the authentication step is accumulated in the authentication assist server 131, so that it is possible to rapidly perform analysis.

Fourth Embodiment

Next, the fourth embodiment of the invention will be described. The fourth embodiment relates to the handling of the authentication protocol used in the first to third embodiments.

By providing the authentication protocol as a Software Development Kit (SDK), it is possible to correspond to each OS without modifying the information of the authentication protocol, regardless of differences in the Operating System (OS) of the terminal device 111.

Also, it is possible to independently provide the authentication protocol for providers other than the provider providing the authentication assist server. The authentication protocol may be provided as a Software Development Kit (SDK) for developing an application including the authentication protocol. Also, as the API, the authentication protocol may be provided to perform synchronization from the service provided by other providers to the authentication assist server.

(Program)

Figure 10:
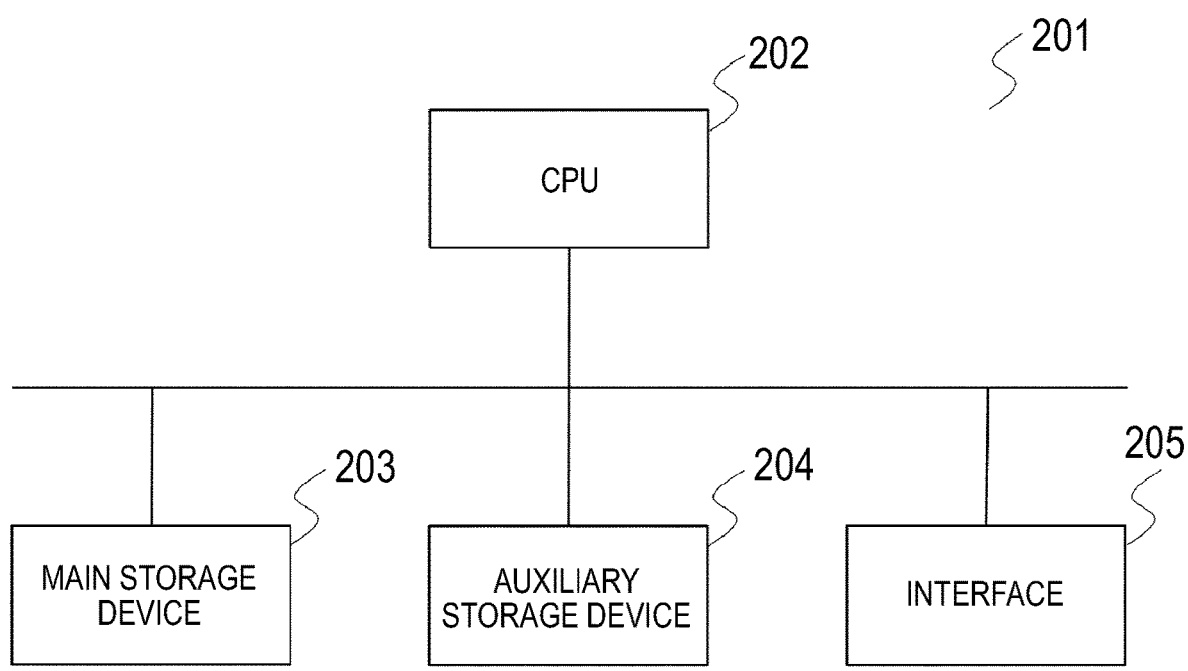
FIG. 10 is a schematic block diagram illustrating the configuration of a computer according to an embodiment.

FIG. 10 is a schematic block diagram illustrating the configuration of a computer 201. The computer 201 includes a CPU 202, a main storage device 203, an auxiliary storage device 204, and an interface 205.

Here, the details of a program for implementing each function configuring the terminal device 111 according to the first embodiment will be described.

The terminal device 111 is mounted on the computer 201. The operation of each component of the server 131 is stored in the auxiliary storage device 204 in the form of a program. The CPU 202 reads a program from the auxiliary storage device 204, develops the program in the main storage device 203, and executes the aforementioned processing according to the program. Also, the CPU 202 secures a storage area corresponding to the storage unit described above in the main storage device 203 according to the program.

The program is a connection program of a terminal device for establishing a wireless connection between an access point and itself and performing communication, that causes an electronic computer to execute a connection step of performing connection to the access point by a terminal communication unit; a reception step of receiving authentication information from the access point by the terminal communication unit; a determination step of determining a type of the authentication information by a terminal control unit; and an authentication step of proceeding with an authentication step based on the authentication information from a determination result of the determination step and an authentication protocol stored in a terminal storage unit, by the terminal control unit.

Incidentally, the auxiliary storage device 204 is an example of a non-temporary tangible medium. Other examples of non-transitory tangible media include magnetic disks connected through an interface 205, magneto-optical disks, CD-ROMs, DVD-ROMs, semiconductor memories, and the like. Also, in a case where this program is distributed to the computer 201 through the network, the computer 201 having received the distribution may develop the program in the main storage device 203 and execute the aforementioned processing.

Also, the program may be for implementing a part of functions described above. Furthermore, the program may be a so-called difference file (difference program) for implementing the aforementioned function in combination with other programs already stored in the auxiliary storage device 204.

As above, although some embodiments of the invention have been described above, these embodiments may be implemented in other various forms, and various omissions, replacements, changes may be made without departing from the scope of the invention. These embodiments and modifications thereof are included in the invention described in the claims and the equivalents thereof as well as included in the scope and the spirit of the invention.

REFERENCE SIGNS LIST 1, 2 Authentication assist system
111, 111a, 111b Terminal device
112 Terminal communication unit
113 Terminal control unit
114 Terminal storage unit
121 Public wireless LAN-AP
121a Public wireless LAN-AP (AP1)
121b Public wireless LAN-AP (AP2)
121c Public wireless LAN-AP (AP3)
121d Public wireless LAN-AP (AP4)
122 Mobile phone line-AP
123 Wireless LAN-AP
131 Authentication assist server
132 Server communication unit
133 Server control unit
134 Server storage unit
141 Network
201 Computer
202 CPU
203 Main storage unit
204 Auxiliary storage device
205 Interface

The invention claimed is:

1. A terminal device for establishing a wireless connection between an access point and itself and performing communication, comprising:
   a terminal communication unit connected to the access point and an authentication assist server;
   a terminal storage unit for storing an authentication protocol that corresponds to a plurality of types of access points; and
   a terminal control unit for determining a type of authentication information transmitted from the access point, proceeding with an authentication step based on the authentication information by the authentication protocol that corresponds to a determination result, and transmitting an authentication result of the authentication step to the authentication assist server through the terminal communication unit,
   wherein the authentication protocol includes a complete authentication protocol in which a procedure of the authentication step up to connection authentication completion is described, and an incomplete authentication protocol in which a procedure of the authentication step up to a step in the middle of connection authentication is described.

2. The terminal device according to claim 1,
   wherein, in a case where the terminal control unit selects the incomplete authentication protocol from the determination result, the terminal control unit proceeds with an authentication step using the incomplete authentication protocol as reference information.

3. The terminal device according to claim 1,
   wherein, in a case where the terminal control unit selects the incomplete authentication protocol from the determination result, the terminal control unit performs analysis of the authentication information and proceeds with an authentication step based on an analysis result.

4. The terminal device according to claim 1,
   wherein, in a case where the terminal control unit selects the incomplete authentication protocol from the determination result, the terminal control unit transmits authentication information to the authentication assist server and proceeds with an authentication step by information transmitted from the authentication assist server corresponding to the authentication information.

5. The terminal device according to of claim 1,
   wherein the terminal control unit determines whether or not a type of the authentication information is at least a type in which user information is requested, and selects the corresponding authentication protocol.

6. The terminal device according to claim 1, wherein the user information includes at least any one or all of e-mail address information, birthday information, birth month information, birth year information, and gender information, and
the terminal control unit determines whether a type of the authentication information is at least a type in which information from an access point is transmitted to a requested e-mail address.

7. The terminal device according to claim 1, wherein the authentication information is authentication HTML, and the terminal control unit proceeds with the authentication step by performing transmission and reception in HTML with the access point.

8. The terminal device according to claim 1, wherein, in a case where the authentication step is interrupted at a step in the middle of connection authentication, the terminal control unit transmits, to the authentication assist server, a history of processing of the authentication step until interruption.

9. A connection method of a terminal device for establishing a wireless connection between an access point and itself and performing communication, comprising:
a connection step of performing connection to the access point by a terminal communication unit;
a reception step of receiving authentication information from the access point by the terminal communication unit;
a determination step of determining a type of the authentication information by a terminal control unit; and
an authentication step of proceeding with an authentication step of the authentication information from a determination result of the determination step and an authentication protocol stored in a terminal storage unit, by the terminal control unit,
wherein the authentication protocol includes a complete authentication protocol in which a procedure of the authentication step up to connection authentication completion is described, and an incomplete authentication protocol in which a procedure of the authentication step up to a step in the middle of connection authentication is described.

10. A storage device storing a connection program of a terminal device for establishing a wireless connection between an access point and itself and performing communication, that causes an electronic computer to execute:
a connection step of performing connection to the access point; a reception step of receiving authentication information from the access point; a determination step of determining a type of the authentication information; and an authentication step of proceeding with an authentication step based on the authentication information from a determination result of the determination step and an authentication protocol stored in a terminal storage unit,
wherein the authentication protocol includes a complete authentication protocol in which a procedure of the authentication step up to connection authentication completion is described, and an incomplete authentication protocol in which a procedure of the authentication step up to a step in the middle of connection authentication is described.

11. An authentication assist system for authenticating a wireless connection between a terminal device and an access point, comprising:
the authentication assist server storing an access point table corresponding to the access point, and a user table corresponding to the terminal device;
the terminal device requesting connection with the access point;
the access point transmitting authentication information in response to a connection request from the terminal device; and
a network connecting the authentication assist server, the access point, and the terminal device,
wherein the terminal device includes a terminal communication unit connected to the access point and the authentication assist server, a terminal storage unit for storing an authentication protocol that corresponds to a plurality of types of access points, and a terminal control unit for determining a type of authentication information transmitted from the access point, proceeding with an authentication step based on the authentication information by the authentication protocol that corresponds to a determination result, and transmitting an authentication result of the authentication step to the authentication assist server through the terminal communication unit, and
the authentication protocol includes a complete authentication protocol in which a procedure of the authentication step up to connection authentication completion is described, and an incomplete authentication protocol in which a procedure of the authentication step up to a step in the middle of connection authentication is described.

* * * * *